(12) United States Patent
Ziehm

(10) Patent No.: US 6,189,573 B1
(45) Date of Patent: Feb. 20, 2001

(54) STOPPER FOR MOUNTING FITTING

(76) Inventor: Fritz Ziehm, 47026 Jefferson, Chesterfield, MI (US) 48047

( * ) Notice: Under 35 U.S.C. 154(b), the term of this patent shall be extended for 0 days.

(21) Appl. No.: 09/506,187

(22) Filed: Feb. 17, 2000

(51) Int. Cl.[7] .................................................. F16L 55/10
(52) U.S. Cl. .......................... 138/89; 138/96 R; 138/104
(58) Field of Search .................................... 138/89, 96 R, 138/96 T, 104

(56) References Cited

U.S. PATENT DOCUMENTS

| | | | |
|---|---|---|---|
| 235,859 | 12/1880 | Dudley et al. | 16/373 |
| 327,246 | 9/1885 | Delamater | 5/136 X |
| 707,712 | * 8/1902 | Nethery | 138/104 |
| 2,010,569 | * 8/1935 | Sitzler | 138/894 |
| 3,370,615 | * 2/1968 | Tamaki et al. | 138/96 |
| 3,749,131 | * 7/1973 | Burger | 138/89 |
| 4,062,299 | 12/1977 | Smith | 108/42 |
| 4,587,921 | 5/1986 | Currey | 114/363 |
| 5,197,406 | 3/1993 | Rabal et al. | 114/363 |
| 5,496,141 | * 3/1996 | Popsys | 138/89 X |
| 5,622,211 | * 4/1997 | Martin et al. | 138/89 |
| 5,816,292 | * 10/1998 | Wilson et al. | 138/89 |
| 5,833,385 | 11/1998 | Carnahan et al. | 403/377 |

\* cited by examiner

*Primary Examiner*—Patrick Brinson
(74) *Attorney, Agent, or Firm*—Young & Basile, PC

(57) ABSTRACT

A stopper for covering a mounting fitting of the type used to hold a chair, table or similar object in an operative position on the floor or other surface of a boat or recreational vehicle is usable with a range of different sized fittings. The stopper is made of an elastomer and has a generally conical plug which fits into the central hole of the fitting and a thin, flat cover extending radially outward from the plug to cover the top of the fitting. The upper end of the plug is slightly greater in diameter than the smallest hole with which the stopper is intended for use, and the lower is slightly greater in diameter than the largest hole with which the stopper is intended for use. The lower end of the plug is cut off at the correct distance below the cover to leave a newly cut lower end with a diameter of the proper size to provide a snug fit within the interior of the mounting fitting hole. A series of axially spaced circumferential ribs, projecting from the outer surface of the plug to provide an easily deformable surface which increase the area of surface contact between the plug and the interior surface of the fitting hole to thereby provide a more secure fit.

10 Claims, 1 Drawing Sheet

STOPPER FOR MOUNTING FITTING

FIELD OF THE INVENTION

The present invention relates to mounting fittings such as those which receiving legs or poles to support a table or other object above a surface, and more specifically to a stopper for plugging the central hole in such a fitting when the support leg is not in place.

BACKGROUND OF THE INVENTION

Boats and wheeled recreational vehicles (RVs) are commonly equipped with seats, tables, and other objects which are supported by legs or poles which fit into mounting fittings disposed on a floor or other surface of the vehicle. This type of mounting holds the chair or table firmly in its operative position to prevent the object from sliding around when the boat or RV is in motion. If it is desired to move the object to provide more usable space of to store the item elsewhere, the object may be moved from its operative by simply pulling the support leg upwardly out of the mounting fitting. Smaller objects such as flag poles or fishing rod holders are also removably held in mounting fittings.

Such mounting fittings usually take the form of a circular metal plate having a central hole and a hollow cylindrical sleeve extending downwardly from the central hole. The sleeve may be slightly tapered, narrowing toward the bottom, to match a similar taper on the end of the leg that mates with the fitting. The fitting is placed over a hole formed in the floor or other mounting surface so that the disk lays flat against the upper surface and the sleeve fits downwardly into the hole. Screws or equivalent fastening means pass through the disk and into the underlying surface to hold the fitting in place. Mounting fittings of this type are available in a wide variety of sizes to receive support legs of different diameters.

When the support leg is removed from the mounting fitting, the fitting is exposed and may constitute a tripping hazard. A person walking on the floor may catch his or her toe in the hole or may slide on the smooth upper surface of the disk. Another drawback associated with such mounting fittings is that water or other debris may get into the central hole and be difficult to remove. There is, therefore, a need for a device capable of covering a range of differently sized mounting fittings when they are not in use.

SUMMARY OF THE INVENTION

The present invention provides a stopper which is easily modified by the user to cover a range of different sized mounting fittings in a floor or other surface. The stopper comprises a thin, flat cover and a generally conical plug extending downwardly from the center thereof. The cover is preferably of sufficient diameter to cover most or all of the flange portion of a mounting fitting with which it is used. The upper end of the plug is slightly greater in diameter than the smallest hole with which the stopper is intended for use, and the lower is slightly greater in diameter than the largest hole with which the stopper is intended for use. The stopper is preferably made of rubber or a synthetic elastomer. To modify the stopper to fit a fitting of a particular size, the user cuts off the lower end of the plug at the correct distance below the cover to leave a newly cut lower end with a diameter of the proper size to provide a snug fit within the interior of the mounting fitting hole. The plug is inserted into the fitting and deforms as necessary to achieve a snug fits in the hole to retain the device in place. The cover overlays the fitting plate to provide a non-skid surface.

In a preferred embodiment of the invention disclosed herein, the plug has a series of axially spaced circumferential ribs projecting from its outer surface. Each of the ribs defines a location along the axis of the plug having a larger diameter than the one above it. The circumferential ribs provide an easily deformable surface which increase the area of surface contact between the plug and the interior surface of the fitting hole to thereby provide a more secure fit. The ribs also serve as cutting guide lines to make it easier to cut the plug in a straight line.

The invention stopper may also include markings at axially spaced locations along the plug to indicate the correct locations at which to cut the plug to modify it for use with holes of particular diameters.

The present invention also provides a method of covering a mounting fitting in a floor in which the lower end of a generally conical plug is cut off to leave a newly-cut lower end having a diameter sized to fit snugly into a central hole in the mounting fitting, and the plug is inserted into the hole until a generally flat cover extending radially outward from an upper end of the stopper is flush with an upper surface of the mounting fitting.

Other objects, advantages and applications of the present invention will become apparent to those skilled in the art when the following description of the best mode contemplated for practicing the invention is read in conjunction with the accompanying drawings.

BRIEF DESCRIPTION OF DRAWINGS

The description herein makes reference to the accompanying drawings wherein like reference numerals refer to like parts throughout the several views, and wherein.

DETAILED DESCRIPTION OF THE PREFERRED EMBODIMENT

Figure 1:
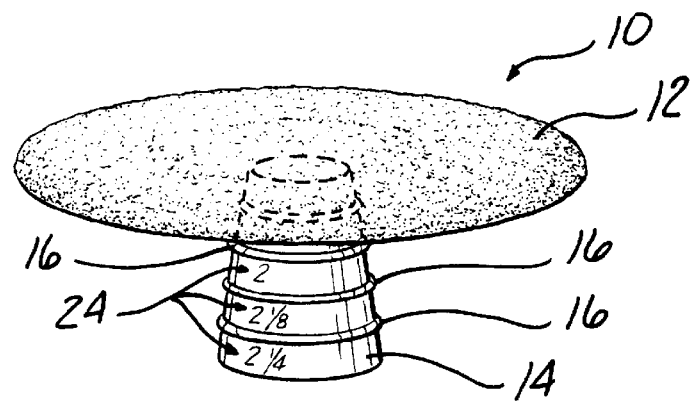
FIG. 1 is a perspective view of a stopper according to the present invention.
Figure 2:
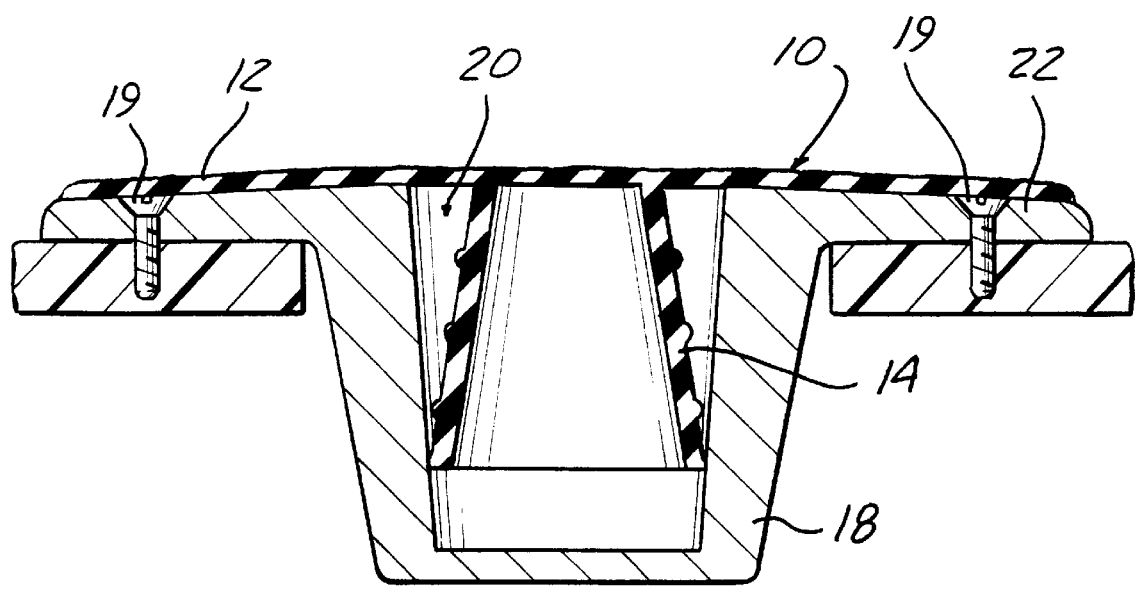
FIG. 2 is a side view of the stopper of FIG. 1 cut to length and inserted in a mounting fitting.

As seen in FIGS. 1 and 2, a stopper 10 according to the present invention comprises a thin, flat cover 12 and a generally conical plug 14 extending downwardly from the approximate center of the cover. Stopper 10 is preferably made from a rubber or synthetic elastomer material.

Plug 14 is of a minimum diameter adjacent its upper end where it is attached to cover 12, and increases in diameter to reach a maximum adjacent its lower end. The minimum and maximum diameters of plug 14 depend upon the range of sizes of holes with which the particular stopper 10 is intended for use. In the preferred embodiment, plug 14 is substantially hollow but it may alternatively be solid. A plurality of outwardly bulging ribs 16 are formed around the circumference of plug 14 at axially spaced locations.

FIG. 2 shows a stopper 10 according to the present invention in use with a mounting fitting 18 attached to a surface by screws 19. Mounting fitting 18 has a central hole 20 for receiving a support leg, pole or pedestal (not shown) which in turn supports an object such as a table or chair (not shown). Plug 14 is inserted into the: central hole 20 of fitting 18 and cover 12 extends radially outwardly to substantially cover the flange 22 of fitting 18.

The conical shape of plug 14 allows the invention stopper 10 to be modified to fit differently sized mounting fittings having a range of hole diameters. This modification is performed by cutting off the lower end of plug 14 the proper distance below cover 12 to leave a newly-cut lower end having a diameter which fits snugly into the inside of the mounting fitting hole 20. In the preferred embodiment, plug 14 is preferably cut off just below one of ribs 16. This leaves a rib 16 at the newly-cut lower end of plug 14, the rib deforming inwardly when the plug is inserted into mounting fitting 18 and increasing the area of surface contact between the plug 14 and the interior surface of the fitting hole 20, thereby providing a more secure fit. Ribs 16 may also serve as cutting guides to make it easier to cut plug 14 in a straight line when modifying stopper 10.

Cutting plug 14 to the correct diameter may be accomplished by trial and error by cutting off the end of the plug in small increments until the desired snug fit within mounting fitting 18 is achieved. Alternatively, lines, numbers or other indicators may be provided on plug 14 to indicate where to cut to modify the plug 14 for use with a hole 20 having a particular diameter. As seen in FIG. 1, small numerals 24 are located adjacent each of ribs 16, the numbers indicating the diameter of hole 20 which plug 14 will fit if it is cut below the rib. A stopper according to the present invention may also be constructed with no ribs, but with lines and/or other markings on the surface of plug 14 to indicate where to cut the plug 14 to achieve a given diameter.

When plug 14 is inserted into mounting fitting 18, cover 12 preferably extends outwardly to cover substantially all of the upper surface of flange 22 surrounding the hole 20 of mounting fitting 18. The upper surface of cover 12 is much less slippery than the metal surface of flange 22 so that the likelihood of a person slipping on the fitting 18 is greatly reduced. If desired, the upper surface of cover 12 may have a pebbled or other type of textured, non-slip finish.

In addition to reducing the tripping hazard associated with an uncovered mounting fitting 18, the present invention is effective in keeping water, dirt or other debris out of fitting hole 20 where it would otherwise tend to accumulate and be difficult to remove.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

The invention claimed is:

1. A stopper for plugging a circular hole of a mounting fitting in a floor of a vehicle comprising:

a generally conical plug insertable into the hole and having an upper end of a first diameter and a lower end of a second diameter larger than the first diameter, the plug has a series of axially spaced markings indicating distinct, severable locations on the plug selectable to form a different diameter bottom portion on the plug to snugly fit the plug in a circular hole; and a generally flat cover extending radially outward from the upper end of the plug.

2. The stopper according to claim 1 wherein the cover has a diameter sufficiently large to cover at least a portion of a flange of the mounting fitting surrounding the hole.

3. The stopper according to claim 1 wherein the plug has a series of axially spaced, circumferential ribs projecting from an outer surface thereof.

4. The stopper according to claim 1 wherein an upper surface of the cover is textured to provide a non-skid finish.

5. The stopper according to claim 1 made of an elastomeric material.

6. A method of covering a mounting fitting in a floor of a vehicle, the method comprising the following steps:

1) providing a device comprising:
    a generally conical plug with an upper end of smaller diameter than a circular hole of the mounting fitting and a lower end of larger diameter than the hole; and
    a generally flat cover extending radially outward from the upper end of the plug;

2) cutting off the plug at a appropriate distance below the upper end to leave a newly-cut lower end of the plug having a diameter to fit snugly into the hole; and 3) inserting the plug downwardly into the hole.

7. The method according to claim 6 wherein the step of cutting off the plug comprises using as a cutting guide at least one of a series of markings spaced axially along the plug and indicating locations on the plug having different diameters.

8. The method according to claim 6 wherein the step of inserting the plug into the hole comprises inserting the plug sufficiently far into the hole that the cover is flush with an upper surface of the mounting fitting.

9. The method according to claim 7 comprising the step of:

forming the series of markings spaced axially along the plug by one edge of a plurality of axially spaced, circumferential ribs projecting radially outward from the plug.

10. The stopper according to claim 1 wherein the axially spaced markings are defined by one edge of a series of axially spaced, circumferential ribs projecting from an outer surface of the plug, the ribs defining a bore engaging surface when the plug is severed along one edge of one of the ribs.

* * * * *